UNITED STATES PATENT OFFICE.

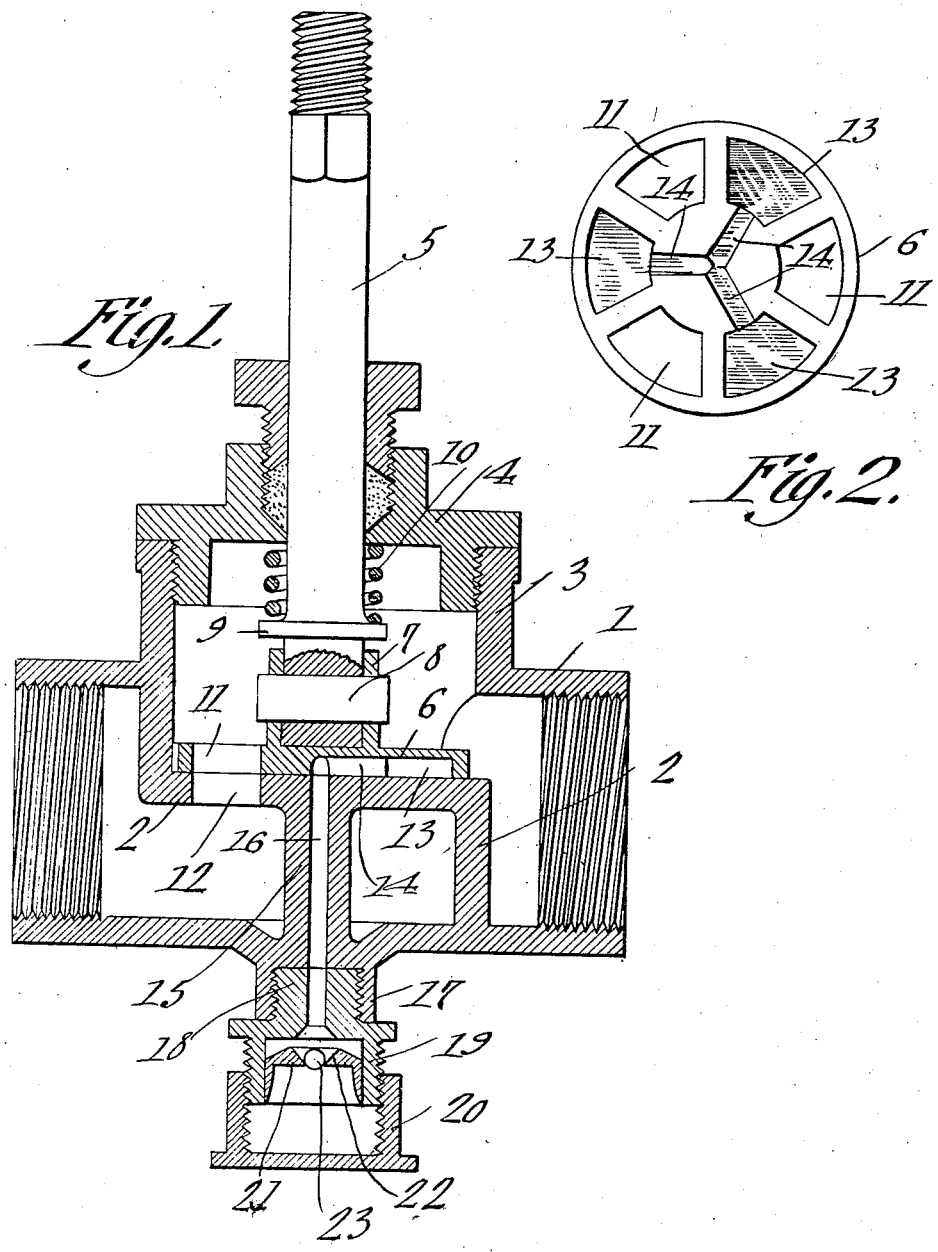

JOHN E. W. FOGAL, OF QUINCY, ILLINOIS, ASSIGNOR TO QUINCY ELEVATOR GATE CO., OF QUINCY, ILLINOIS.

VALVE-LUBRICATING DEVICE.

1,172,446.   Specification of Letters Patent.   Patented Feb. 22, 1916.

Application filed April 8, 1915. Serial No. 20,088.

*To all whom it may concern:*

Be it known that I, JOHN E. W. FOGAL, a citizen of the United States, residing at Quincy, in the county of Adams and State of Illinois, have invented a new and useful Valve-Lubricating Device, of which the following is a specification.

The present invention appertains to valves, and aims to provide a valve having novel and improved means for lubricating the same.

As a more specific object, the invention aims to provide a valve having unique means whereby grease or other lubricant may be forced from the exterior between the valve and its seat, for lubricating the contacting or bearing surfaces of the valve and valve seat.

It is also within the scope of the invention to provide a valve having the above features, and which is comparatively simple and inexpensive in construction, as well as being convenient, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—Figure 1 is a median section of the improved valve. Fig. 2 is a bottom view of the valve proper or valve disk.

In carrying out the invention there is provided a valve casing 1 having a partition 2 therein between its ends and extending between its top and bottom or opposite sides. The casing 1 is provided at its top or at one side of the partition, with an extension 3 into which the bonnet 4 is threaded, and a valve spindle 5 is journaled through the bonnet 4 and carries the valve proper or disk 6 at its lower or inner end. The disk 6 is provided with an upstanding socket member 7 receiving the lower or inner end of the spindle 5, and a key or securing element 8 is engaged through the member 7 and spindle 5 to attach the valve disk 6 to the spindle, and whereby the valve disk will rotate with the spindle for opening and closing the passage through the casing, as desired. The spindle 5 is provided with a collar 9 above the pocket member 7 and below the bonnet 4, and a coiled wire expansion spring 10 surrounds the spindle 5 and is seated against the collar 9 and bonnet 4 for yieldably seating the disk 6 upon the valve seat provided by the partition 2. The valve disk 6 is provided with an annular series of ports or openings 11, and the partition 2 is provided with an annular series of coöperating ports or openings 12. As illustrated, there are three ports 11, and a similar number of ports 12, and the ports of the valve disk and partition are spaced apart sufficiently, so that when the disk 6 is rotated, the ports 11 and 12 may be brought into or out of registration with one another for opening or closing the passage through the valve casing.

Coming to the lubricating means of the structure, the valve disk 6 is provided in its under surface, or that surface which contacts with the partition or valve seat 2, with cells or pockets 13 between the ports 11, and with grooves or channels 14 converging from the cells or pockets 13 to the center of the disk 6. The valve casing 1 is provided with an integral portion 15 between the central portion of the partition or valve seat 2 and the bottom wall of the casing, and a duct or bore 16 passes through the portion 15. The adjacent or meeting ends of the grooves or channels 14 register with the upper or inner end of the duct 16, and the bottom, or that wall of the casing remote from the spindle 5, is provided with a depending or outstanding socket member 17 to which the portion 15 and its duct 16 extend. The nipple 18 of a grease or lubricant cup 19 is threaded into the socket member 17, and a cap 20 is threaded upon the lubricant or grease cup 19. An apertured member 21 is secured within the cup 19, and is provided with an upper or inner valve seat 22 with which a ball valve 23 is coöperable.

In the use of the valve structure, the cup 19 and its cap 20 are filled with grease or other lubricant, this being readily done when the cap 20 is detached. Then, when the cap 20 is applied to the cup 19, and is screwed upwardly or inwardly, the grease will be forced by compression up through the nipple 18 of the cup 19 and thence through the grease or lubricant duct 16 to the valve disk 6. The grease or lubricant will then flow through the grooves or channels 14 to the cells or pockets 13. It is to be noted that when the grease is forced into the valve casing under compression, the ball valve 23 will be unseated to allow the grease or lubricant to flow inwardly or upwardly, but the grease will be prevented from flowing outwardly or backwardly since the ball valve 23 which serves as a check valve, will in seating, prevent this. It is preferable, after the grease or lubricant has been forced into the cells or pockets 13, to unscrew the cap 20 slightly, so that the suction will seat the valve 23 for preventing the return of the grease back into the grease cup. Grease of a thick consistency is preferably employed, in order that it will remain within the cells or pockets 13, even though the pockets or cells are swung over the ports 12 of the partition 2. In forcing the grease or lubricant into the cells 13, the valve disk 6 is swung to open position so that the cells 13 are out of registration with the ports 12, and this will prevent the waste of the grease. The cells 13 containing grease, and the valve disk 6 being rotated, will serve to lubricate the adjacent faces of the valve disk and the partition or seat 2, thereby to reduce friction and wear, and furthermore to eliminate the liability of the valve leaking.

The lubricating device may be employed in various styles of valves, and alterations or changes in the device may be made in adapting the same for use in various valves, within the scope of the appended claim, and without departing from the spirit of the invention.

What is claimed as new is:

In a device of the character described, a valve casing having a partition therein provided with ports, a rotary valve bearing against said partition and having ports adapted to be brought into and out of registration with the aforesaid ports, the valve casing having a portion extending from the central portion of said partition to one wall of the casing and said portion having a duct extending therethrough to the center of the valve, the valve having lubricant cells between its ports and converging grooves extending from the cells and having their adjacent ends in communication with said duct.

In testimony that I claim the foregoing as my own, I have hereto affixed my signature in the presence of two witnesses.

JOHN E. W. FOGAL.

Witnesses:
A. M. GILLE,
C. L. FULGHUM.